United States Patent
Irie et al.

(10) Patent No.: US 6,359,702 B1
(45) Date of Patent: Mar. 19, 2002

(54) IMAGE PROCESSING APPARATUS

(75) Inventors: Yukio Irie; Shinya Okada; Yoshiyuki Okada, all of Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 0 days.

(21) Appl. No.: 09/076,103

(22) Filed: May 12, 1998

(30) Foreign Application Priority Data

May 12, 1997 (JP) .............................................. 9-121029

(51) Int. Cl.[7] .............................. H04N 1/38; H04N 1/40; G06K 9/34
(52) U.S. Cl. .................... 358/1.9; 358/462; 358/466; 358/453; 382/176; 382/270
(58) Field of Search ................................. 382/275, 260, 382/270, 173, 176; 358/466, 462, 1.9, 1.12, 1.18, 452, 453, 296, 1.6

(56) References Cited

U.S. PATENT DOCUMENTS

| | | | |
|---|---|---|---|
| 5,617,484 A | * | 4/1997 | Wada et al. ................. 382/272 |
| 5,790,262 A | * | 8/1998 | Kanno ......................... 358/296 |
| 6,014,470 A | * | 1/2000 | Matsuda ...................... 382/275 |

FOREIGN PATENT DOCUMENTS

| | | |
|---|---|---|
| EP | 0 100 811 A2 | 2/1984 |
| EP | 0 371 744 | 6/1990 |
| EP | 0 405 400 A2 | 1/1991 |
| EP | 0 557 099 A1 | 8/1993 |
| EP | 0 589 136 A2 | 3/1994 |
| JP | 3-261270 | 11/1991 |
| JP | 6-326865 | 11/1994 |
| JP | 7-234555 | 9/1995 |
| WO | WO 89/03150 | 4/1989 |

OTHER PUBLICATIONS

Search Report.

* cited by examiner

*Primary Examiner*—Scott Rogers
(74) *Attorney, Agent, or Firm*—Nixon Peabody LLP; Donald R. Studebaker

(57) ABSTRACT

Image data for a margin around the image area of a book form original can be erased and image data for a book center portion are obtained without loss. In a photograph mode, a low threshold value is set in first binary conversion means 4, and image data having been input are binary converted by using this value. Based on the image data having been converted, a first coercion signal generating unit 6 judges a margin around the original image. A high threshold value is set to second binary conversion means 5 and image data having been input are binary converted by using this value. Based on the image data having been converted, a second coercion signal generating unit 7 judges a margin around the original and a portion including a book center portion. A character processing binary conversion unit 3 carries out binary conversion on input image data for the portion within the original, and outputs whitening data which erase the margin around the original. A photograph processing binary conversion unit 2 carries out tone image binary conversion only on the book center portion in the input image data and outputs the data thereof. An image processing selecting unit 10 makes the image data for the portion within the original image selectively output from the character processing binary conversion unit 3 and makes the image data for the book center portion selectively output from the photograph processing binary conversion unit 2.

4 Claims, 10 Drawing Sheets

ERASING MODE

PHOTOGRAPHIC MODE

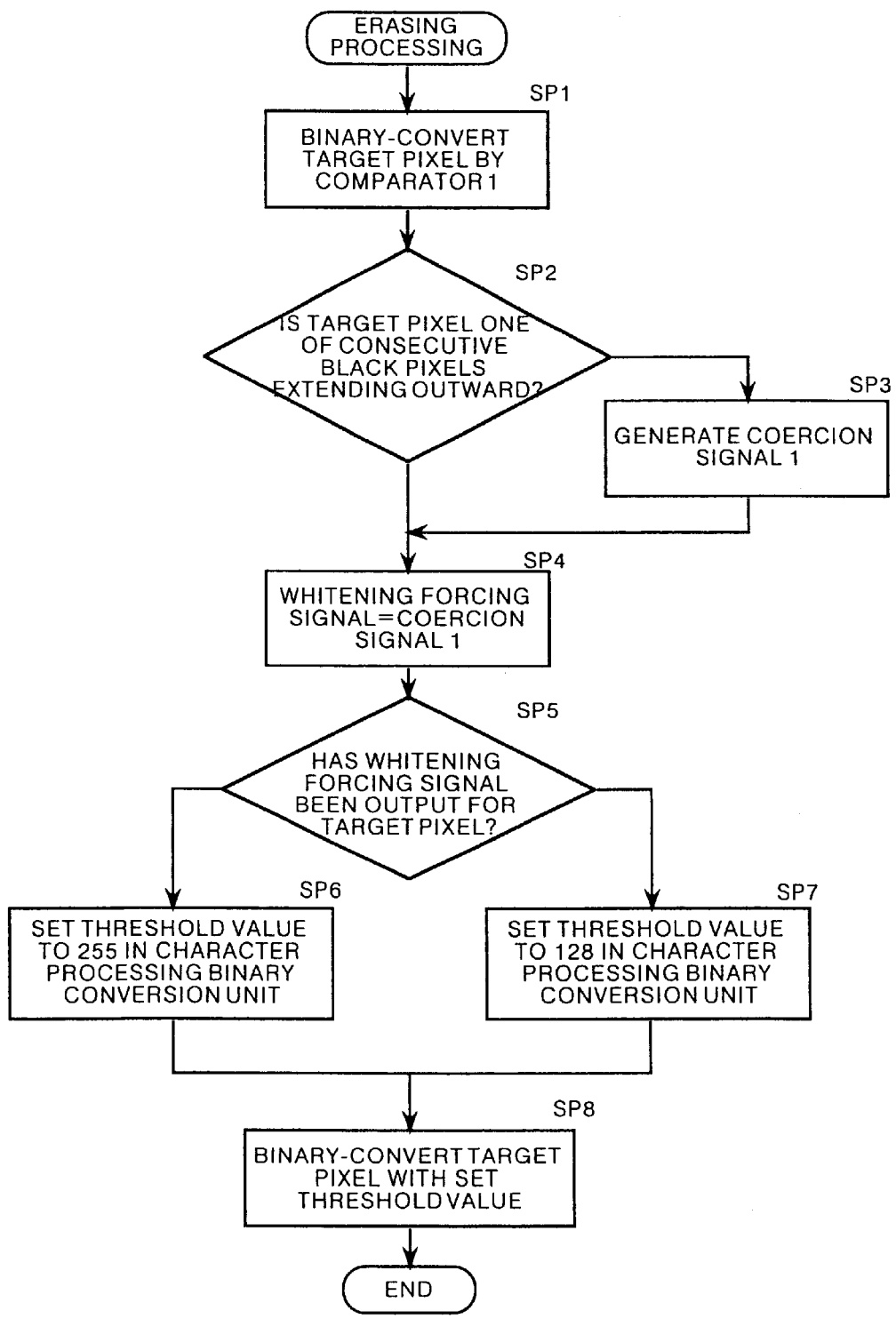

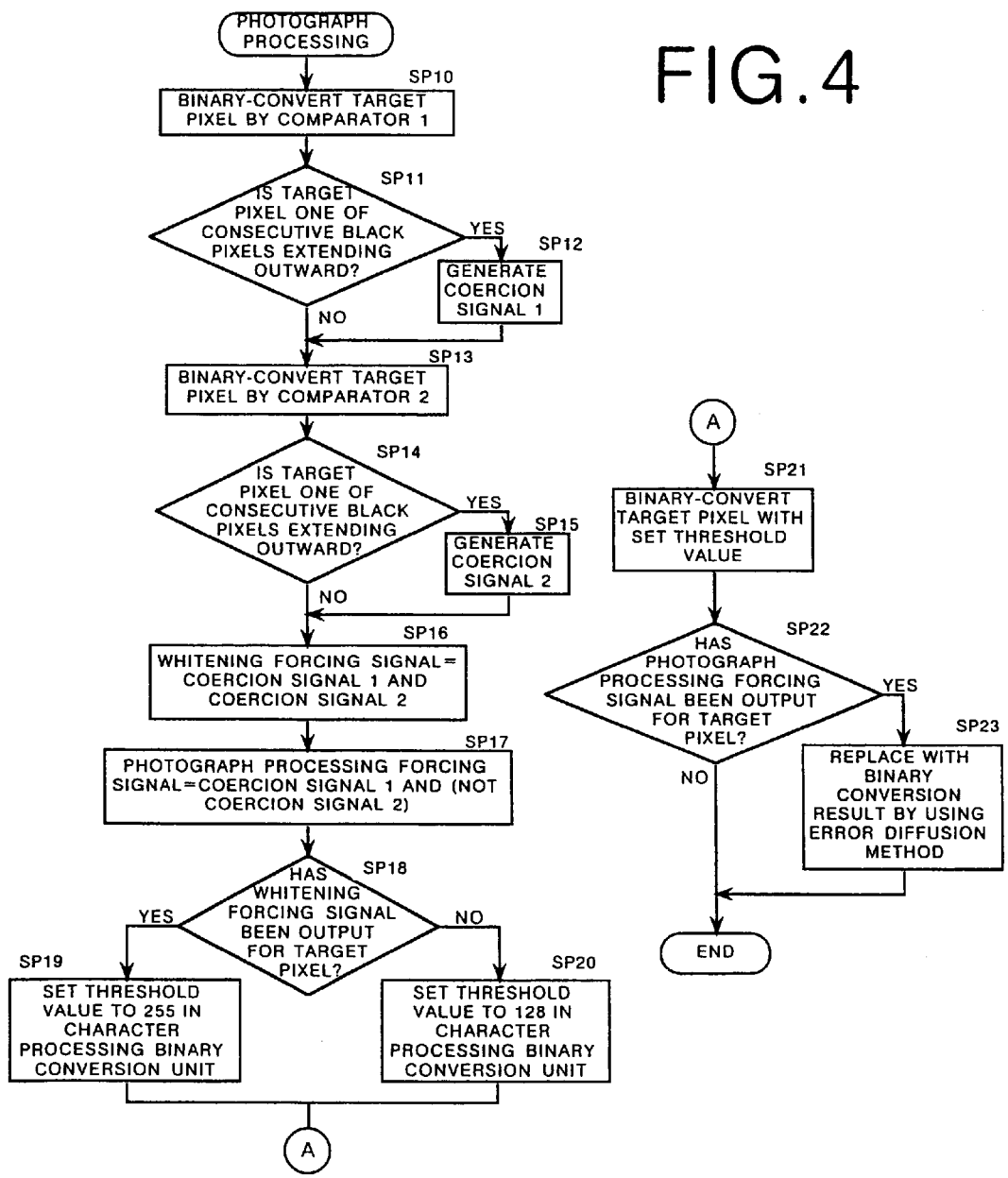

FIG.9

STATE JUDGING TABLE OF RECOGNITION PATTERN I

| COORDINATES | INPUT | | | | OUTPUT | |
|---|---|---|---|---|---|---|
| | ROW n COLUMN m-1 | ROW n-1 COLUMN m | ROW n-1 COLUMN n | ROW n COLUMN n | ROW n COLUMN n | ROW n COLUMN m |
| | b | a2 | a1 | A | C2 | C1 |
| DATA | 0 | 0 | 0 | 0 | 0 | 0 |
| | 0 | 0 | 0 | 1 | 1 | 0 |
| | 0 | 0 | 1 | 0 | 0 | 0 |
| | 0 | 0 | 1 | 1 | 0 | 1 |
| | 0 | 1 | 0 | 0 | 0 | 0 |
| | 0 | 1 | 0 | 1 | 1 | 0 |
| | 0 | 1 | 1 | 0 | 0 | 0 |
| | 0 | 1 | 1 | 1 | 1 | 0 |
| | 1 | 0 | 0 | 0 | 0 | 0 |
| | 1 | 0 | 0 | 1 | 0 | 1 |
| | 1 | 0 | 1 | 0 | 0 | 0 |
| | 1 | 0 | 1 | 1 | 0 | 1 |
| | 1 | 1 | 0 | 0 | 0 | 0 |
| | 1 | 1 | 0 | 1 | 0 | 1 |
| | 1 | 1 | 1 | 0 | 0 | 0 |
| | 1 | 1 | 1 | 1 | 0 | 1 |

FIG.10

STATE JUDGING TABLE OF RECOGNITION PATTERN II

| COORDINATES | INPUT | | | OUTPUT |
|---|---|---|---|---|
| | ROW n+1 COLUMN m | ROW n COLUMN m | ROW n COLUMN m | ROW n COLUMN m |
| | D | C2 | C1 | E |
| DATA | 0 | 0 | 0 | 0 |
| | 0 | 0 | 1 | 1 |
| | 0 | 1 | 0 | 0 |
| | 0 | 1 | 1 | 0 |
| | 1 | 0 | 0 | 0 |
| | 1 | 0 | 1 | 1 |
| | 1 | 1 | 0 | 1 |
| | 1 | 1 | 1 | 1 |

IMAGE PROCESSING APPARATUS

BACKGROUND OF THE INVENTION

1. Field of the Invention

The present invention relates to an image processing apparatus which carries out predetermined image processing on image data having been input and outputs the image data.

2. Description of the Related Art

A flat bed type image processing apparatus is suitable for scanning an image data on a book as an original. A book is opened and placed on the flat bed with the page surface faced down, and a scanner reads an image on the flat bed. The following methods can be used to esthetically process image data corresponding to the dog-ear of the book (a book center) and an outside area of the book.

A first method according to an application filed by Riso Kagaku Corp. (Japanese Unexamined Patent Publn. No. 3(1991)-261270) carries out stencil-making based on image data of an original after placing the original on an image processing apparatus. When the original is roughly read (pre-scan), areas within and outside the original are recognized by operation on the pre-scan result. The original is then read again (main scan) and image processing is carried out on image data for the portion of the original recognized through the pre-scan.

A second method disclosed in Japanese Unexamined Patent Publn. No. 6(1994)-326865 erases a book center portion of a book form original and the area of the book center portion can be esthetically processed after only one time reading of the book form original.

In the first method, pre-scan is necessary and so is the time therefor. Furthermore, since image processing upon main scan is carried out in a state wherein areas are recognized as the same as in the pre-scan, the result of area recognition becomes useless if the position of the original is changed during the time between the pre-scan and the main scan, and improper image data are output.

In the second method, since the book center portion is erased, it is a problem that information on the book center portion is lost.

Furthermore, since a threshold value for binary conversion of character data is predetermined, a problem occurs in reproducing an original written on dark color paper or an original with faint letters.

SUMMARY OF THE INVENTION

The present invention has been created to solve the above problems. The object of the present invention is to provide an image processing apparatus whereby image data for a margin around a book form original are erased and image data for a book center portion thereof are obtained without loss. Another object is to provide an image processing apparatus which can reproduce an original written in characters more esthetically.

To achieve the above objects, an image processing apparatus of the present invention comprises binary conversion means which carries out binary conversion using a predetermined threshold value on an image signal read by original reading means;

a coercion signal generating unit which extracts a margin around an original based on the binary image signal having been binary converted by the binary conversion means; and a character processing binary conversion unit in which a threshold value is set variably so that the portion extracted by the coercion signal generating unit is output as whitening data and the image signal of the portion other than the extracted portion is output as character data after binary conversion thereon.

Another image processing apparatus comprises first binary conversion means which carries out binary conversion using a first threshold value on an image signal read by original reading means;

a first coercion signal generating unit which extracts a margin around an original based on the binary image signals having been binary converted by the first binary conversion means;

second binary conversion means which is installed in parallel to the first binary conversion means and carries out binary conversion using a second threshold value higher than the first threshold value on the image signal read by the original reading means;

a second coercion signal generating unit which extracts a margin around the original based on the binary image signal having been binary converted by the second binary conversion means;

a character processing binary conversion unit in which a threshold value is variably set so that the portion extracted by the first coercion signal generating unit is output as whitening data and the image signal of the portion other than the extracted portion is output as character data after binary conversion thereon;

a photograph processing binary conversion unit which carries out binary conversion for photograph data on the image signal having been read by the original reading means; and an image processing selecting unit wherein the binary converted data output from the character processing binary conversion unit and the photograph processing binary conversion unit are input and the binary converted data from the photograph processing binary conversion unit are output for an area which has been extracted by the first coercion signal generating unit and not extracted by the second coercion signal generating unit, while the binary converted data from the character processing binary conversion unit are output for the area other than the above.

The image processing apparatus may comprise character binary conversion threshold value calculating means which calculates a threshold value for outputting the image signal as binary converted character data from the character processing binary conversion means.

The first coercion signal generating unit judges a margin around an original by the output from the first binary conversion means having the first threshold value. The second binary conversion means which has the threshold value higher than the first carries out binary conversion for the area within the original including the book center portion thereof. The second coercion signal generating unit judges the area other than the margin around the original and the book center portion of the original by using the second threshold value.

Based on an logic operation result using the output signals from the first and the second coercion signal generating units, the book center portion is judged.

By using the image processing apparatus of the present invention, when an original bound as a book (a book form original) is read by a flat bed type original reading apparatus, a dog-ear portion (a book center portion) of the original which is not in contact with the original reading apparatus and the margin around the original are output after binary conversion by the photograph processing binary conversion unit and the image of the book form original can be esthetically processed.

BRIEF DESCRIPTION OF THE DRAWINGS

FIG. 3 is a flow chart showing processing of the erasing mode;

FIG. 4 is a flow chart showing processing of the photograph mode;

FIG. 9 is a state judging table referred to in the recognition pattern 1 in the forward scanning direction; and FIG. 10 is a state judging table referred to in the recognition pattern 2 in the reverse scanning direction.

DESCRIPTION OF THE PREFERRED EMBODIMENTS

Figure 1:
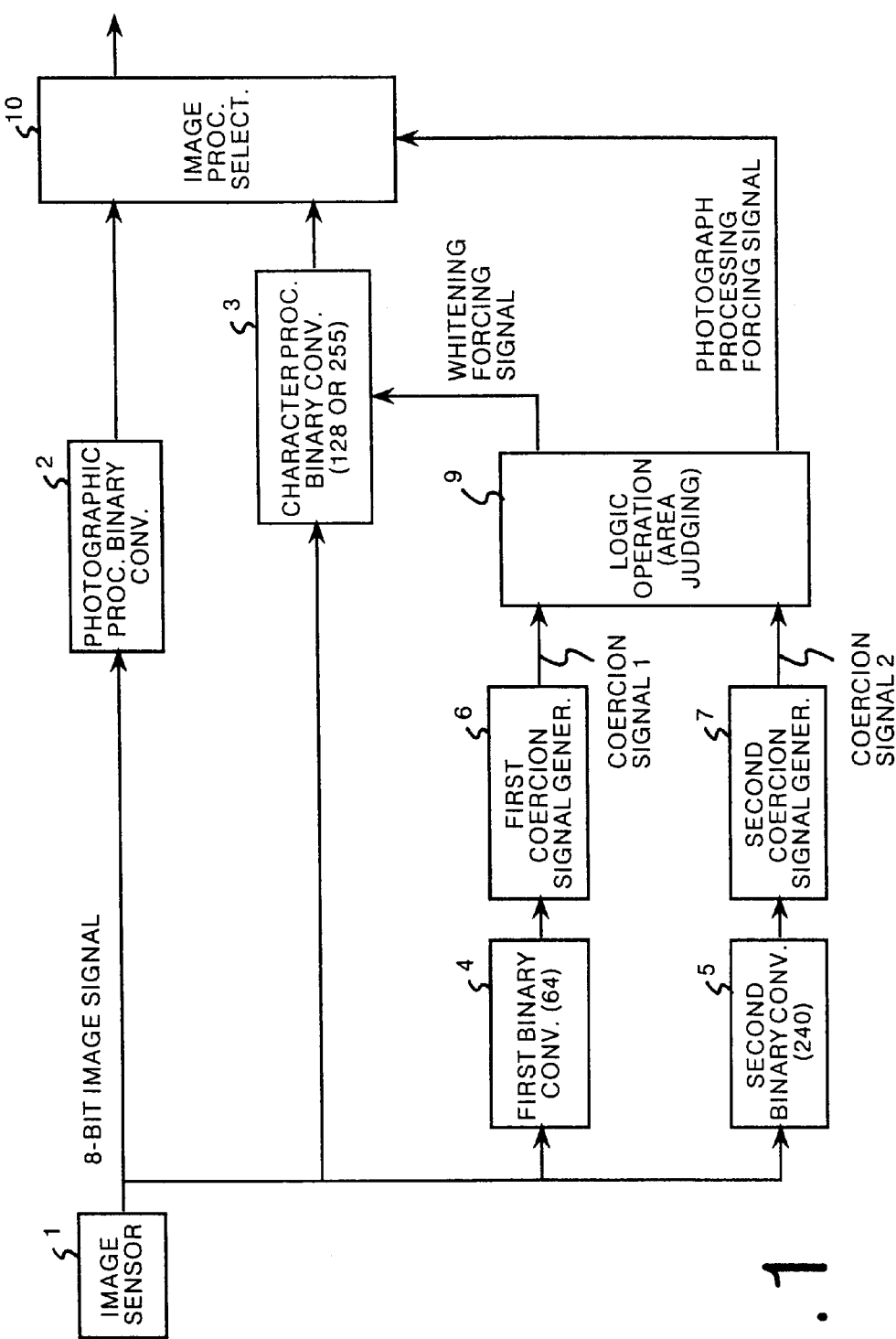
FIG. 1 is a block diagram showing an embodiment of an image processing apparatus according to the present invention.

FIG. 1 is a block diagram showing an image processing apparatus of the present invention.

In this specification, an example configuration wherein a book form original having a dog-ear(the book center portion) is image processed is used for explanation.

Image signals from an image sensor 1 are sequentially input for each pixel through horizontal and vertical scanning of the original to a photograph processing binary conversion unit 2, a character processing binary conversion unit 3, first binary conversion means 4, and second binary conversion means 5. The image signals are expressed in 256 tones wherein white is expressed by "0" and black by "255".

The photograph processing binary conversion unit 2 outputs binary converted image data after error diffusion processing has been carried out on input image data.

The character processing binary conversion unit 3 outputs a binary image on which binary conversion suitable for an original written in characters has been carried out. A threshold value for the binary conversion in the character processing binary conversion unit 3 is usually set to "128" as a standard when the 256 tones is used. This threshold value is changed to a fixed value whose maximum is 255, when a whitening forcing signal is input from a logic operation unit 9.

The first binary conversion means 4 carries out binary conversion on the image signals from the image sensor 1 by using a relatively low threshold value "64" in comparison with the value "128" when the 256 tones is used. Likewise, the second binary conversion means 5 carries out binary conversion by using a relatively high threshold value "240". The binary converted signals are transferred to first and second coercion signal generating units 6 and 7 respectively.

Figure 2A:
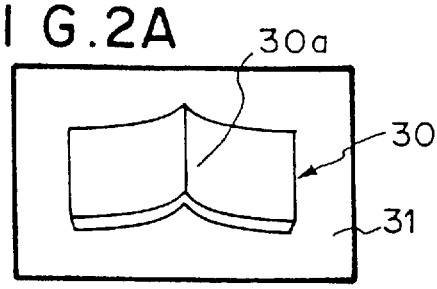
FIG. 2 is a diagram showing the content of image processing carried out by the image processing apparatus; wherein (a) is an original on an original placing table, (b) shows image data during half tone image processing, (c) shows image data during binary conversion using a low threshold value, (d) shows image data during binary conversion using a high threshold value, (e) shows a scanning state, (f) shows output data in an erasing mode, and (g) shows output data in a photograph mode.
Figure 2B:
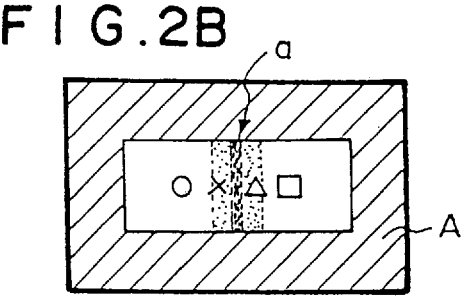
Figure 2C:
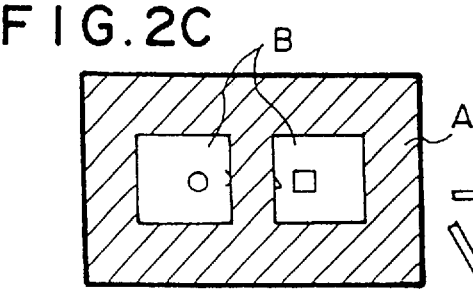
Figure 2F:
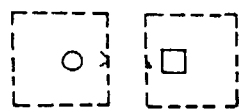
Figure 2D:
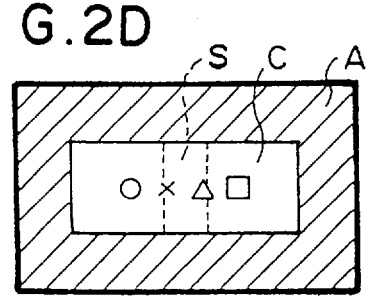
Figure 2G:
Figure 2E:
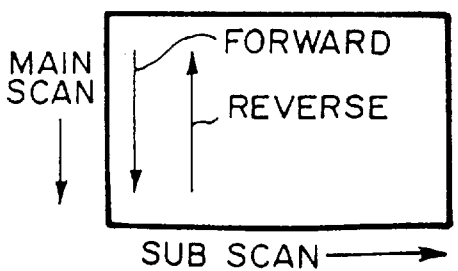

The first and the second coercion signal generating units 6 and 7 extract consecutive black pixels shown by diagonally hatched areas in FIGS. 2(c) and 2(d) from the binary converted results respectively input thereto, and output a first and a second coercion signals to the logic operation unit 9.

The logic operation unit 9 carries out area judging based on the first and second coercion signals and outputs whitening forcing signal and a photograph processing forcing signal.

There are two kinds of area judging mode. One is "an erasing mode" which erases both a margin around an original and a book center portion. The other is "a photograph mode" which erases the margin around the original and carries out photograph processing on the book center portion. Setting of these modes are not shown in the figure. However, they can be switched from one to the other by a setting switch in an operation unit.

FIG. 2 shows a binary image for each threshold value when an original is read and binary converted.

As shown in FIG. 2(a), an original (a book form original) 30 is placed onto an original placing table 31 as the flat bed under which a scanner unit having an image sensor 1 is movably placed. A book center portion 30a of the original 30 is not in contact with the original placing table 31.

FIG. 2(b) shows image data of the original 30 read by multi-values (the 256 tones). As shown in this figure, density values of the image data of a margin around the original 30 (shown by a diagonally hatched area in FIG. 2(b)) are close to black 255. Likewise, in the book center portion 30a within the original 30, the density becomes higher toward the center since the book center portion 30a is not in contact with the original placing table 31.

FIG. 2(c) shows image data output after binary conversion thereon by a low threshold value 64 by using the first binary conversion means 4. When the image data are binary converted by using a low threshold value, image data of the margin around the original 30 and the book center portion 30a have image data showing black 255, as shown in FIG. 2(c). Within the image area of the original 30, data of a portion B excluding the book center portion 30a have been binary converted.

FIG. 2(d) shows image data output after binary conversion thereon by a high threshold value 240 by using the second binary conversion means 5. When the image data are binary converted by a high threshold value, only the margin around the original 30 has image data showing black 255, as shown in FIG. 2(d). Image data of a portion C within the original have been binary converted, as shown in FIG. 2(d).

Image data of the area A shown by the hatched area after binary conversion by the first and the second binary conversion means 4 and 5 are transferred to the photograph processing binary conversion unit 2 respectively via logic operation unit 9 as whitening forcing signals.

In the erasing mode, the logic operation unit 9 outputs to the character processing binary conversion unit 3 first coercion signals (the diagonally hatched area in FIG. 2(c)) having been output from the first coercion signal generating unit 6 as the whitening forcing signals. In this manner, when the whitening forcing signals are output, the threshold value for binary conversion is set to 255 and the character processing binary conversion unit 3 outputs image data of the margin around the original 30 and the book center portion 30*a* as data showing white color.

In the photograph mode on the other hand, based on the first coercion signals (the diagonally hatched area in FIG. 2(C)) having been output from the first coercion signal generating unit 6 and the second coercion signals (the diagonally hatched area in FIG. 2(*d*)) output from the second coercion signal generating unit 7, the logic operation unit 9 outputs whitening forcing signals for a portion (the diagonally hatched portion in FIG. 2(*d*)) which overlaps between the above two portions to both the photograph processing binary conversion unit 2 and the character processing binary conversion unit 3.

Furthermore, the logic operation unit 9 outputs, to an image processing selecting unit 10, whitening forcing signals for a portion (an area S in FIG. 2(*d*)) which do not overlap between the two portions, that is, the area wherein the first coercion signals have been output but the second coercion signals have not.

The image processing selecting unit 10 selects data having been input from either the photograph processing binary conversion unit 2 or the character processing binary conversion unit 3, based on the presence or absence of the photograph processing forcing signal. When the photograph processing forcing signal is input, the data from the photograph processing binary conversion unit 2 are selected and output.

Image processing operation by the image processing apparatus in the above configuration will be explained next with reference to a flow chart in FIG. 3. A pixel in input image data is treated as a target pixel and processing for this pixel will be explained below.

1. In the Erasing Mode

In the erasing mode, the first binary conversion means 4 and the first coercion signal generating unit 6 are used while the second binary conversion means 5 and the second coercion signal generating unit 7 are not used.

The target pixel is binary converted by using the binary conversion means 4 (SP1).

The first coercion signal generating unit 6 then judges whether or not the target pixel is one of consecutive black pixels extending outward (SP2). This judging will be explained later. At SP2, if the judgment is YES, a coercion signal 1 is generated (SP3). On the other hand, if the judgment is NO at SP2, no processing occurs.

The coercion signal generating unit 6 outputs the whitening forcing signal to the logic operation unit 9 when the coercion signal 1 exists (SP4).

The logic operation unit 9 judges whether or not the whitening forcing signal has been generated for the target pixel (SP5). If the judgment result at SP5 is YES, the threshold value for the character processing binary conversion unit 3 is set to the maximum 255 (SP6). If the judgment result at SP5 is NO, the threshold value for the character processing binary conversion unit 3 is set to the normal value 128 (SP7).

The character processing binary conversion unit 3 then carries out binary conversion on the target pixel by using the threshold value having been set (SP8).

Image data after binary conversion are output through the image processing selecting unit 10. In this manner, in the erasing mode, the margin around the original 30 and the book center portion 30*a* are output in white as shown in FIG. 3, and the image data within the area of the original are output as simply binary converted image data.

FIG. 2(*f*) shows image data output in the erasing mode.

As shown in FIG. 2(*f*), both the margin around the original 30 on the original placing table 31 and the book center portion 30*a* thereof are replaced by white. The information in the book center portion 30*a* is lost. However, an unnecessary portion in black is erased and image data with better-looking can be obtained. At the same time, a noise component in the image data is eliminated and the data size can be reduced.

2. In the Photograph Mode

In the photograph mode, the first and the second binary conversion means 4 and 5, and the first and the second coercion signal generating units 6 and 7 are all used.

The target pixel is binary converted by the first binary conversion means 4 (SP10).

The first coercion signal generating unit 6 judges whether or not the target pixel is one of consecutive black pixels extending toward the outside (SP11). The judging will be explained later. At SP11, if the judgment is YES, a coercion signal 1 is generated (SP12). On the other hand, if the judgment is NO at SP11, no processing occurs.

The target pixel is binary converted by the second binary conversion means 5 (SP13). The second coercion signal generating unit 7 judges whether or not the target pixel is one of the consecutive black pixels extending toward the outside (SP14). The judging will be explained later. At SP14, if the judgment is YES, a coercion signal 2 is generated (SP15). On the other hand, if the judgment is NO at SP11, no processing occurs.

The logic operation unit 9 outputs the whitening forcing signal to the character processing binary conversion unit 3 when both the first and the second coercion signals have been output for the target pixel (SP16).

When the first coercion signal 1 has been output and the second coercion signal 2 has not, the photograph processing forcing signal is output to the image processing selecting unit 10 (SP17).

The character processing binary conversion unit 3 judges whether or not the whitening forcing signal has been output for the target pixel (SP18). When the judgment at SP18 is YES, the threshold value is set to the maximum 255 (SP19). If the judgment at SP18 is NO, the threshold value is set to the normal value 128 (SP20).

The character processing binary conversion unit 3 carries out binary conversion on the target pixel by using the threshold value having been set (SP21).

When the photograph processing forcing signal has been output for the target pixel (SP22-YES), the image processing selecting unit 10 selects binary image data which have been pseudo-half-tone processed and output the data to another apparatus such as an image forming apparatus (SP23).

FIG. 2(*g*) shows image data output in the photograph mode.

As shown in this figure, the margin around the original 30 on the original placing table 31 is replaced by white. The book center portion 30*a* (the area S in FIG. 2(*d*)) is pseudo-half-tone processed.

In this manner, the unnecessary margin in black around the original is erased and the information in the book center portion 30*a* is obtained without loss.

In the photograph mode, the noise component of the image data is also eliminated.

In either the erasing mode or the photograph mode, the above image processing can be carried out by placing the original 30 on the original placing table 31 and scanning it only one time. Therefore, pre-scan is not necessary, and image data having only necessary information of the original can be obtained promptly by simple operation.

Figure 5:
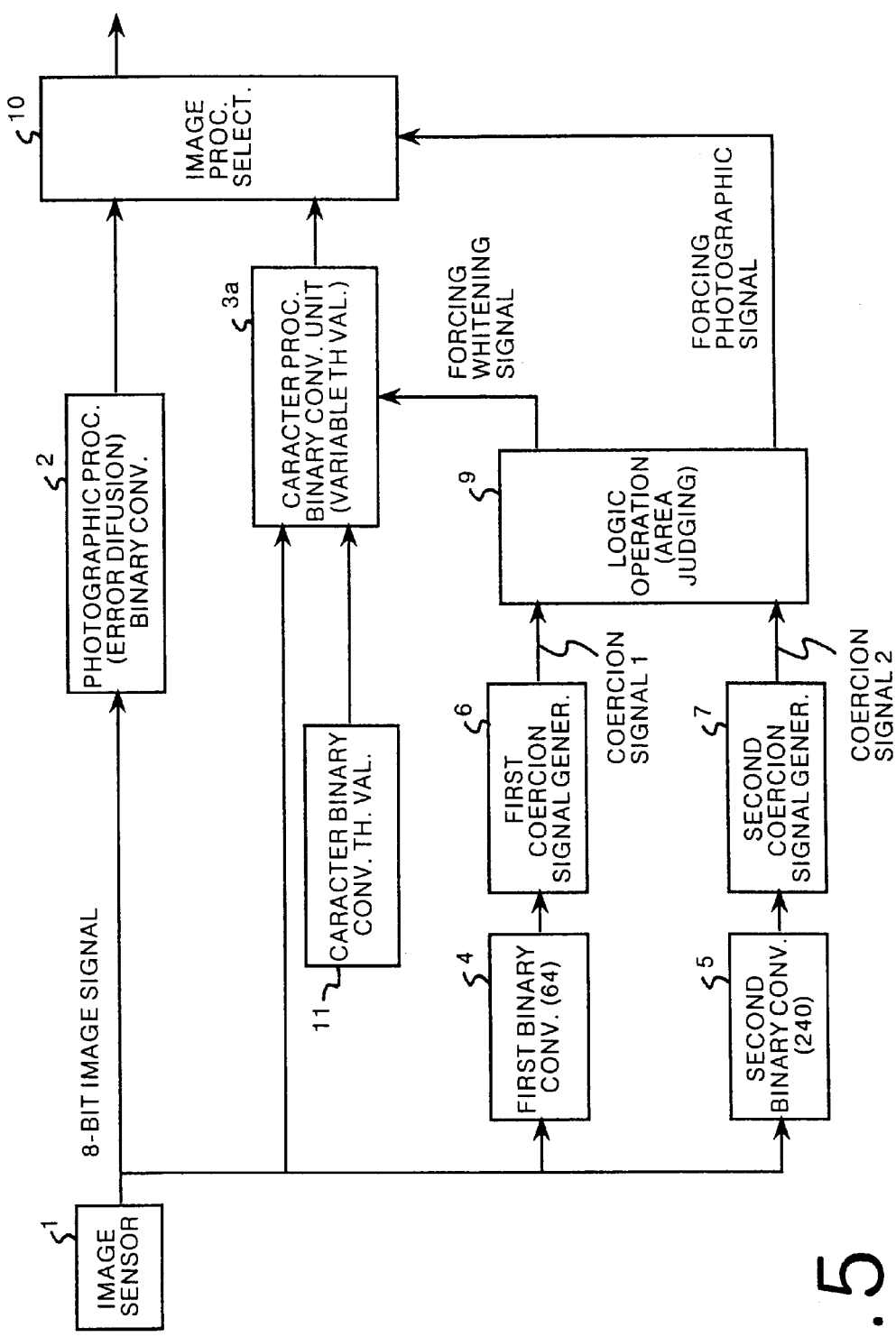
FIG. 5 is a block diagram showing another embodiment of the image processing apparatus of the present invention.

FIG. 5 shows another embodiment of the image processing apparatus of the present invention.

Among configuration elements in FIG. 5, explanation for the elements in common with FIG. 1 is not provided here.

Character binary conversion threshold value calculating means 11 is to calculate a threshold value for binary conversion of characters when binary conversion is not carried out by a character processing binary conversion unit 3a by using a threshold value 255 corresponding to a whitening forcing signal.

In the previous embodiment, the target pixel for which the whitening forcing signal has not been generated is binary converted by a single threshold value 128. However, this method does not deal with an original whose background color is dark or an original written in faint characters, and the background may become dotty or the characters sometimes become hazy.

The character binary conversion threshold value calculating means 11 calculates an appropriate threshold value for binary conversion of a character, based on setting regarding whether the density of an original is high or low set in the operation panel within the image processing apparatus which is not shown in FIG. 5. The calculated threshold value is input to the character processing binary conversion unit 3a.

The character processing binary conversion unit 3a carries out binary conversion using the maximum 255 on image data having been input, when the whitening forcing signal is input from the logic operation unit 9. If the whitening forcing signal is not input from the logic operation unit 9, the character processing binary conversion unit 3a carries out binary conversion on input image data by using the character binary conversion threshold value having been calculated by the character binary conversion threshold value calculating means 11. The character processing binary conversion unit 3a then outputs the binary converted image data to the image processing selecting unit 10.

In this embodiment, since the image processing apparatus is configured so that the character binary conversion threshold value calculating means 11 calculates the character binary conversion threshold value corresponding to the density of an original set by an operator even when the density of characters or paper color of the original varies a little, better-looking image can be obtained.

Since the character processing binary conversion unit 3a is configured so that the threshold value thereof can be changed, the character processing binary conversion unit 3a can be shared as means for setting both the threshold value corresponding to the density of an original and the maximum threshold value 255 corresponding to the whitening forcing signal, which greatly contributes to simplification of circuits.

Figure 6:
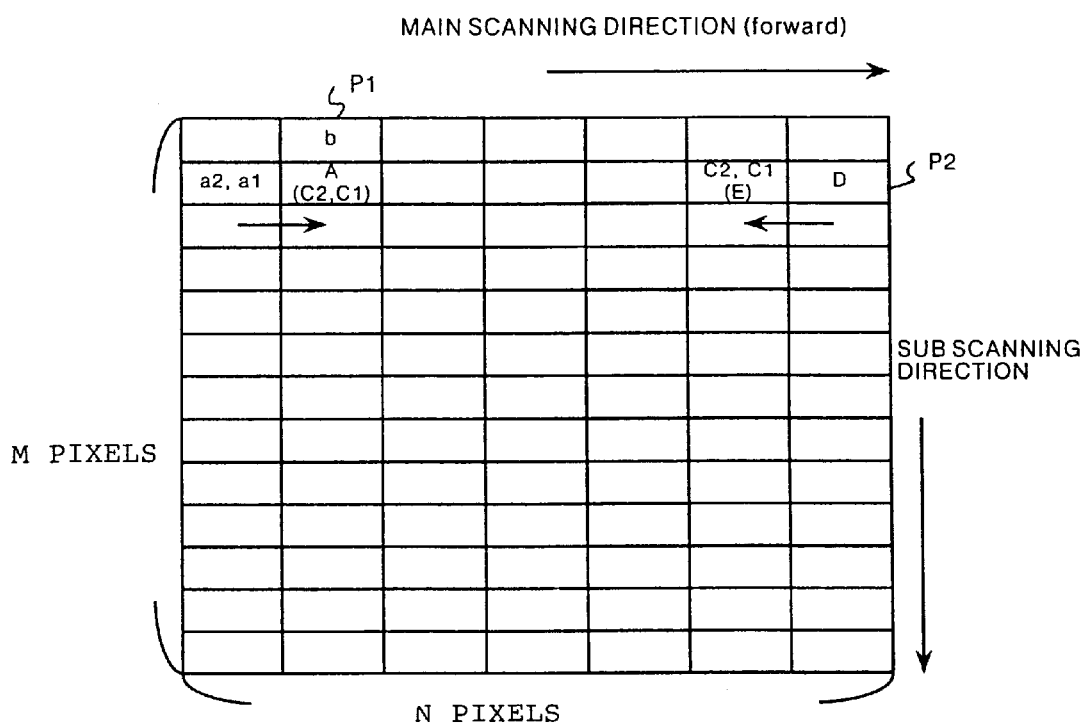
FIG. 6 is a diagram showing recognition patterns 1 and 2 to detect consecutive black pixels (part 1)

FIG. 6 shows a scanning state of an original on the above image processing apparatus.

As shown in this figure, the original 30 is dealt with as N×M pixels and read by the main scanning direction and the sub-scanning direction. This scan is carried out in an order wherein one pixel row is scanned in the forward and the reverse directions along the main scanning direction and then scanned vertically. The following pixel row is scanned likewise in the forward and the reverse directions along the main scanning direction.

As shown in FIG. 6, the main scan detects consecutive black pixels by using three adjacent pixel data in the forward direction (a recognition pattern P1). In this recognition pattern P1, one pixel is regarded as a target pixel which has a binary data A (1 bit). While the pixel immediately preceding the target pixel along the forward main scanning direction has data (a2, a1) (2 bits), and the pixel immediately above the target pixel along the vertical scanning direction has data b (1 bit). The data (a2, a1) and b are scanned earlier, and obtained by reading from a memory storing them. When the target pixel is read, the data A for the target pixel are converted into 2 bit data (C2, C1) based on the data for the above 3 pixels by using a state judging table (see FIG. 9) of the recognition pattern P1 which will be described later, and stored in the memory.

The reverse direction of the main scan detects the consecutive black pixels by using data corresponding two pixels (a recognition pattern P2). In this recognition pattern P2, a target pixel has 2 bits data (C2, C1) which have been stored in the memory at the main scan in the forward direction. At this time, the pixel immediately preceding the target pixel along the reverse main scanning direction has data D (1 bit). When the data (C2, C1) for target pixel is read, 1 bit data E is generated and stored in the memory by using a state judging table for the recognition pattern P2 (see FIG. 10).

Area judging processing of the consecutive black pixels will be explained with reference to flow charts in FIGS. 7 and 8.

Figure 7:
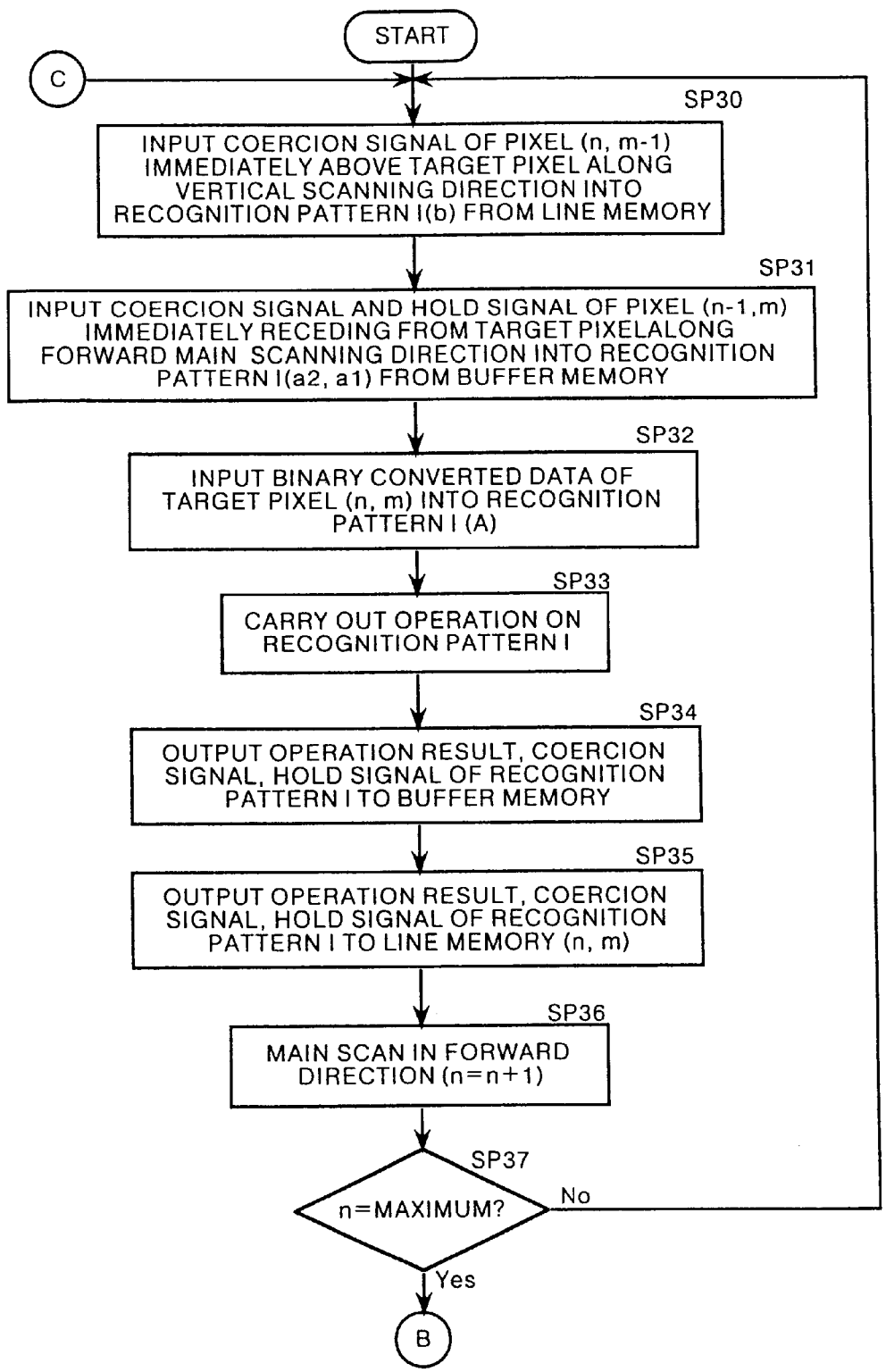
FIG. 7 is a flow chart showing detection processing of the consecutive black pixels (part 1)

The main scan of the target pixel in the forward direction is carried out (see FIG. 7).

Data which is output as a result of the P2 for a pixel (n, m−1) immediately above the target pixel along the vertical scanning direction are input to b of the recognition pattern 1 from the memory (SP30).

Data which is output as a result of the P1 for a pixel (n−1, m) immediately receding from the target pixel along the forward scanning direction are input to a2 and a1 of the recognition pattern 1 from the memory (SP31).

The data after binary conversion of the read target pixel (n, m) are input to A in the recognition pattern 1 (SP32).

After these data are ready for the three pixels, output data are obtained by using the state judging table of the recognition pattern 1 shown in FIG. 9 (SP33).

In the state judging table in FIG. 9, the states of the data 0/1 of the pixels b and a1 show whitening forcing signal not having been output (=0) or having been output (=1).

The data states 0/1 of a2 show the states wherein output of the coercion signal is not judged by the processing in the forward direction and a hold signal showing whether or not it is judged in the following reverse direction is output (=1) and not output (=0).

The data states 0/1 of the target pixel show image data input after binary conversion processing by the binary conversion means 4 and 6 in white (=0) and black (=1).

The output data C2 and C1 are obtained by the combination of the data for the three pixels.

The data states 0/1 of the output data C1 show the whitening forcing signal is not output (=0) and output (=1).

The data states 0/1 of the output data C2 show the states wherein output of the coercion signal is not judged by the processing in the forward direction and a hold signal showing whether or not it is judged in the following reverse direction is output (=1) and not output (=0).

Based on the state judging table of the recognition pattern 1, presence or absence of output of C2 (the hold signal) of the target pixel and C1 (the whitening forcing signal) thereof is recorded in the memory. The memory comprises a buffer memory for external recording and a line memory for external output.

The C2 and C1 of the target pixel are output to the buffer memory and the line memory respectively (SP34, and SP35).

In the above processing from SP30 through SP35, the main scan is carried out for one pixel in the forward direction. After this processing, in SP36, the target pixel is shifted by one pixel in the forward direction (n=n+1).

Until the main scan in the forward direction is carried out for the entire pixels (n pixels) in one row (SP37-YES), the processing goes back to SP30 and is carried out for each pixel.

For example, in the main scan in the forward direction by using the recognition pattern 1, when b shows 0 (the coercion signal is not output), a1 shows 0 (the coercion signal is not output), the hold signal a2 for the target pixel is 1 (the hold signal is output) and the binary converted data of the target pixel is 1 (black), the output data are 0 for C1 and 0 for C2.

Figure 8:
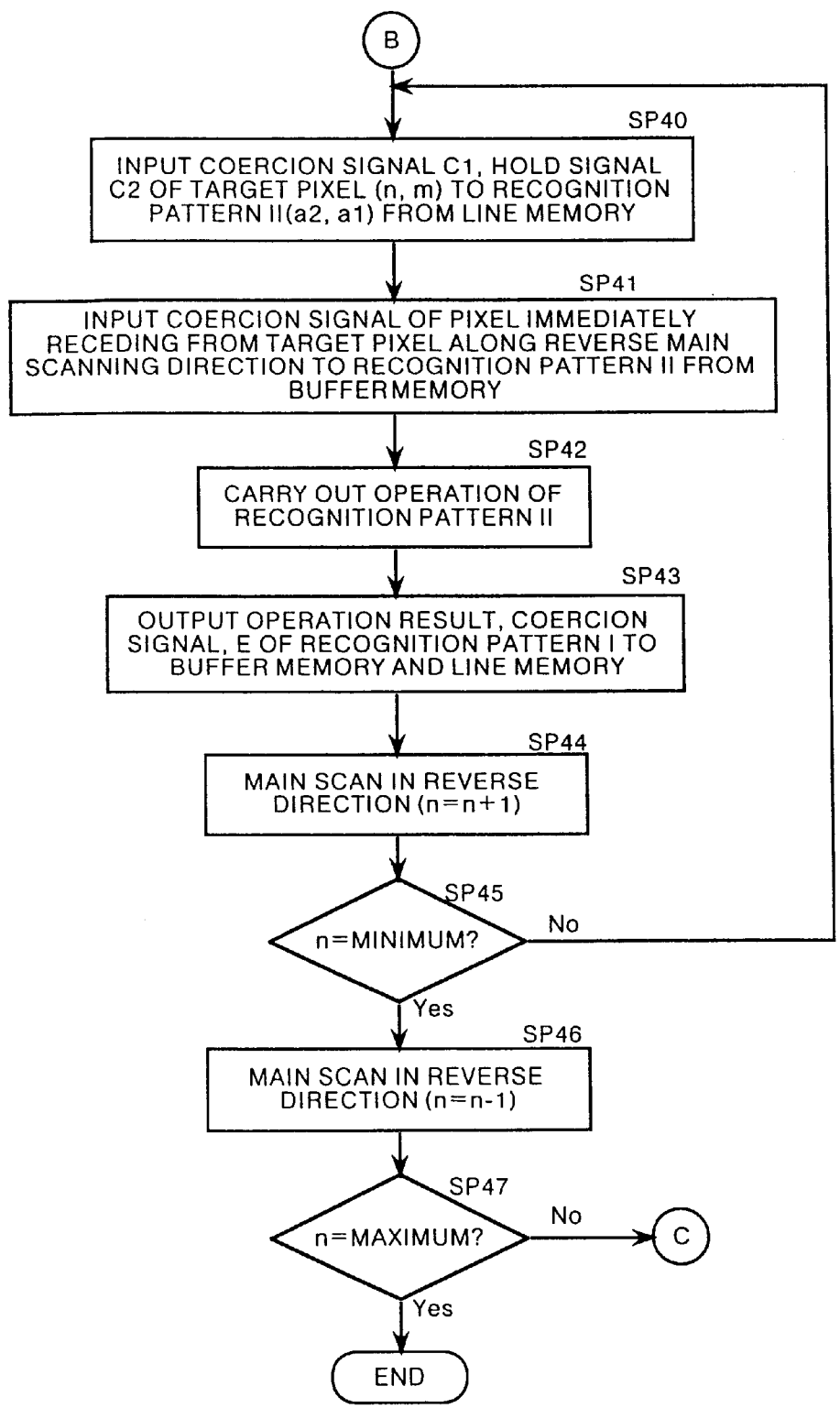
FIG. 8 is a flow chart showing detection processing of the consecutive black pixels (part 2)

The main scan in the reverse direction is then carried out for the target pixel (see FIG. 8).

The whitening forcing signal C1 and the hold signal C2 for the target pixel are input from the line memory to the recognition pattern 2 (SP40).

The coercion signal of the pixel (n+1, m) immediately receding from the target pixel along the reverse main scanning direction is input from the line memory to the recognition pattern 2 (SP41).

After the data for these two pixels are ready, output data are obtained by referring to a state judging table of recognition pattern 2 shown in FIG. 10(SP42).

In the state judging table in FIG. 10, the data states 0/1 of C1 and D the states wherein the coercion signal is not output (=0) and output (=1).

The data states 0/1 of C2 show the states wherein the hold signal in the processing in the forward direction is not output (=0) and output (=1).

Based on the combination of these data for the two pixels, output data E are obtained.

The data states 0/1 of the output data E show the states wherein the whitening forcing signal is not output (=0) and output (=1).

Based on the state judging table for the pattern recognition 2, the output data E (the forcing signal) for the target pixel are output to both the buffer memory and the line memory (SP43).

The target pixel is then shifted by one pixel (n=n−1) along the reverse direction at SP44.

Until the entire n pixels in one row are scanned in the reverse direction (SP45-YES), the processing goes back to SP40 and is carried out for each pixel.

For example, in the main scanning in the reverse direction by using the recognition pattern 1, when C1 shows 0 (the coercion signal is not output), C2 shows 1 (the hold signal is output), and D shows 1 (the coercion signal is output), the output data E show 1.

In this manner, the main scan is carried out in the forward direction by using the recognition pattern 1 for three pixels and in the reverse direction by using the recognition pattern 2 for two pixels. By going back and forth, the presence or absence of the coercion signal for the target pixel (the output data E) can be judged.

In other words, in the case where output of the coercion signal is not determined in the forward direction alone, it is judged by scanning in the reverse direction, and consecutive black pixels extending from the margin to the inside thereof can be detected by respectively scanning from the both ends of an original.

According to the image processing apparatus of the present invention, since the image processing apparatus comprises the means which extracts the margin and the means which carries out binary conversion on the margin and the portion other than that by using different threshold values, the margin is output in white by binary conversion thereon using a high threshold value while the portion other than that is output as character data by the binary conversion thereon using a character processing binary conversion threshold value. Therefore, the margin and the book center portion are extracted as the portion other than the area of the original, and output in white by a high threshold value. A fine output image without the margin or the book center portion in black can be obtained.

The image processing apparatus pays attention to the fact that the margin has higher density than the book center portion of a book form original. By extracting the margin by using high and low threshold values, and based on the result, the margin is binary converted in white and the book center portion is binary converted as tone image data. In this manner, the methods of binary conversion for the margin wherein characters do not exist and the book center portion of a book form original wherein characters may exist are different each other, and a necessary character area in the book center portion is output as tone image data which can reproduce characters without being lost.

Furthermore, since the character binary conversion threshold value corresponding to the density of an original can be set, the original written in characters can be reproduced esthetically.

In each case, the image processing apparatus can output image data by only one time reading of an original without pre-scanning, and it is easier to operate and more time saving.

What is claimed is:

1. An image processing apparatus comprising:
    a binary converter which carries out binary conversion using a predetermined threshold value on an image signal read by original reading means;
    a coercion signal generating unit which extracts a margin around an original based on the binary image signal having been binary converted by said binary converter; and
    a character processing binary conversion unit in which a threshold value is set variably so that the portion extracted by said coercion signal generating unit is output as whitening data and the image signal of the portion other than the extracted portion is output as character data after binary conversion thereon.

2. An image processing apparatus comprising:
    a first binary converter which carries out binary conversion using a first threshold value on an image signal read by original reading means;
    a first coercion signal generating unit which extracts a margin around an original based on the binary image signal having been binary converted by said first binary converter;
    a second binary converter which is installed in parallel to said first binary converter and carries out binary conversion using a second threshold value higher than said first threshold value on the image signal read by the original reading means;
    a second coercion signal generating unit which extracts a margin around the original based on the binary image signal having been binary converted by said second binary converter;
    a character processing binary conversion unit in which a threshold value is variably set so that the portion extracted by said first coercion signal generating unit is output as whitening data and the image signal of the portion other than the extracted portion is output as character data after binary conversion thereon;

a photograph processing binary conversion unit which carries out binary conversion for photograph data on the image signal having been read by said original reading means; and an image processing selecting unit wherein the binary converted data output from said character processing binary conversion unit and said photograph processing binary conversion unit are input and the binary converted data from said photograph processing binary conversion unit are output for an area which has been extracted by said first coercion signal generating unit and not extracted by said second coercion signal generating unit, while the binary converted data from said character processing binary conversion unit are output for the area other than the above.

3. An image processing apparatus as claimed in claim 2 further comprising a character binary conversion threshold value calculator which calculates a threshold value for outputting the image signal as binary converted character data from said character processing binary conversion unit.

4. An image processing apparatus as claimed in claim 1 further comprising a character binary conversion threshold value calculator which calculates a threshold value for outputting the image signal as binary converted character data from said character processing binary conversion unit.

* * * * *